(12) United States Patent
Ludwig

(10) Patent No.: US 11,617,054 B2
(45) Date of Patent: Mar. 28, 2023

(54) METHOD AND DEVICE FOR DETERMINING A POSITION OF A MOBILE PARTICIPANT OF A WIRELESS COMMUNICATION NETWORK, PARTICIPANT OF THE WIRELESS COMMUNICATION NETWORK, REMOTELY DISPOSED NETWORK UNIT, WIRELESS COMMUNICATION NETWORK

(71) Applicant: Robert Bosch GmbH, Stuttgart (DE)

(72) Inventor: Stephan Ludwig, Renningen-Malmsheim (DE)

(73) Assignee: Robert Bosch GmbH, Stuttgart (DE)

(*) Notice: Subject to any disclaimer, the term of this patent is extended or adjusted under 35 U.S.C. 154(b) by 89 days.

(21) Appl. No.: 17/232,215

(22) Filed: Apr. 16, 2021

(65) Prior Publication Data

US 2021/0329411 A1    Oct. 21, 2021

(30) Foreign Application Priority Data

Apr. 16, 2020 (DE) .................. 102020204819.3

(51) Int. Cl.
| | |
|---|---|
| *H04W 24/00* | (2009.01) |
| *H04W 4/02* | (2018.01) |
| *H04W 4/029* | (2018.01) |
| *H04L 1/08* | (2006.01) |
| *H04W 4/021* | (2018.01) |

(52) U.S. Cl.
CPC .............. *H04W 4/023* (2013.01); *H04L 1/08* (2013.01); *H04W 4/021* (2013.01); *H04W 4/029* (2018.02)

(58) Field of Classification Search
CPC ..... H04W 4/023; H04W 4/029; H04W 4/021; H04L 1/08
See application file for complete search history.

(56) References Cited

U.S. PATENT DOCUMENTS

| | | |
|---|---|---|
| 2005/0270227 A1 | 12/2005 | Stephens |
| 2011/0177777 A1 | 7/2011 | Kim |
| 2016/0054440 A1* | 2/2016 | Younis ................. G01S 13/753 342/55 |
| 2017/0082729 A1 | 3/2017 | Bar-Shalom |

FOREIGN PATENT DOCUMENTS

WO     2017052780 A1    3/2017

* cited by examiner

*Primary Examiner* — Erika A Washington
(74) *Attorney, Agent, or Firm* — Michael Best & Friedrich LLP

(57) ABSTRACT

A method is provided for determining a position of a mobile participant of a wireless communication network, wherein the method comprises: determining (102) a first distance between the mobile participant and a stationary participant of the wireless communication network depending on a location signal transmitted by the stationary participant or the mobile participant; determining (104) a second distance between a stationary replicator unit and the mobile participant depending on a replicated signal which is transmitted by means of the stationary replicator unit depending on the location signal, and depending on a further distance between the replicator unit and the stationary participant; and determining (106) a position of the mobile participant depending on the first distance and depending on the second distance.

13 Claims, 5 Drawing Sheets

METHOD AND DEVICE FOR DETERMINING A POSITION OF A MOBILE PARTICIPANT OF A WIRELESS COMMUNICATION NETWORK, PARTICIPANT OF THE WIRELESS COMMUNICATION NETWORK, REMOTELY DISPOSED NETWORK UNIT, WIRELESS COMMUNICATION NETWORK

BACKGROUND OF THE INVENTION

The invention relates to a method and a device for determining a position of a mobile participant of a wireless communication network, a participant of the wireless communication network, a remotely disposed network unit and a wireless communication network.

Localization solutions which use radio waves to determine the position of mobile participants are generally known.

SUMMARY OF THE INVENTION

A first aspect of the description relates to a method for determining a position of a mobile participant of a wireless communication network, wherein the method comprises: determining a first distance between the mobile participant and a stationary participant of the wireless communication network depending on a location signal transmitted by the stationary participant or by the mobile participant; determining a second distance between a stationary replicator unit and the mobile participant depending on a replicated signal which is transmitted by means of the stationary replicator unit depending on the location signal, and depending on a further distance between the replicator unit and the stationary participant; and determining a position of the mobile participant depending on the first distance and depending on the second distance.

The stationary replicator unit with known spatial position reflects the location signal which is transmitted by the stationary participant of the wireless network with known position or by the mobile participant. As a result, a mobile participant is localizable even if, for example, the number of stationary participants with a line-of-sight connection to the mobile participant is too small. The spatial positioning of the mobile participant can thereby be determined by means of radio signals, even if only a few anchor nodes or stationary participants with a direct line-of-sight connection are available.

In addition, the replicator units serve to increase the precision of the determination of the spatial position of the mobile participant.

Furthermore, through the provision of replicator units, the localization becomes more resistant to attacks which are intended to simulate an incorrect position of the mobile participant.

Applications benefit from the improved localization. Measured values recorded by mobile participants thus become useful for data analysis only if the spatial position of the mobile participants, i.e. the location of the recording of the respective measured value, is known. The determination of the spatial position of the mobile participants is also a prerequisite for specific functions which are to be implemented.

Indoor localization solutions in the manufacturing sector or building management, in particular, benefit from the proposed localization scheme. Manufacturing processes, are, on one hand, reliant, for example, on precise position determination for mobile participants, while, on the other hand, manufacturing environments change dynamically, whereby obstacles potentially block a direct line-of-sight connection from which the localization benefits. Use cases for the proposed localization comprise: track and trace for tools and products, production documentation for safety-relevant products, automated industrial trucks, documentation of the machinery with machine positions, etc.

The localization precision is therefore improved and the costs, for example for installation and purchase of stationary participants, are simultaneously reduced.

One advantageous example is characterized in that the method comprises: determining at least one further distance between the mobile participant and a further stationary replicator unit or a further stationary participant; and determining the position of the mobile participant depending on the first distance, depending on the second distance and depending on the at least one further distance.

The more distances that can be determined from different stationary participants or replicator units to which the mobile participant has a direct line-of-sight connection, the more precise the localization of the mobile participant becomes.

One advantageous example is characterized in that the method comprises: determining the at least one further distance between the further stationary replicator unit and the mobile participant depending on a further replicated signal which is transmitted by means of the further stationary replicator unit depending on a location signal transmitted by a further stationary participant or by the mobile participant, and depending on a further distance between the further stationary replicator unit and the stationary participant.

A plurality of replicator units are advantageously used to determine the position of the mobile participant, whereby the density of the stationary participants of the wireless communication network from the perspective of the localization of mobile participants can be reduced.

One advantageous example is characterized in that the method comprises: determining the at least one further distance between the further stationary participant and the mobile participant depending on a further location signal which is transmitted by means of the further stationary participant.

A plurality of stationary participants with a line-of-sight connection to the mobile participant are advantageously used to determine the position of the mobile participant.

One advantageous example is characterized in that the method comprises: determining the second distance, in particular a further value of the second distance, between the stationary replicator unit and the mobile participant depending on a further replicated signal which is transmitted by means of the stationary replicator unit depending on the location signal of the mobile participant or a location signal transmitted by a further stationary participant, and depending on a further distance between the replicator unit and the further stationary participant.

The stationary replicator unit can advantageously be used multiple times to improve the estimation of the second distance. This means either that the replicator unit emits replicated signals depending on location signals originating from different stationary participants, or that the replicator unit emits the location signal originating from the mobile participant in such a way that it reaches at least two different stationary participants.

In one advantageous example, the method comprises: determining a third distance between a or the first participant of the wireless communication network and the stationary replicator unit depending on a location signal transmitted by the first stationary participant; determining a fourth distance between a second participant and the stationary replicator unit depending on a location signal transmitted by the second stationary participant; and determining a position of the replicator unit depending on the first distance and depending on the second distance.

As a result, the previously unknown positions of statically disposed replicator units can advantageously be determined by the network itself.

A second aspect of this description relates to a device for determining a position of a mobile participant of a wireless communication network, wherein the device is configured to determine a first distance between the mobile participant and a stationary participant of the wireless communication network by means of a processing unit depending on a location signal transmitted by the stationary participant or by the mobile participant; to determine a second distance between a stationary replicator unit and the mobile participant by means of a processing unit depending on a replicated signal which is transmitted by means of the stationary replicator unit depending on the location signal, and depending on a further distance between the replicator unit and the stationary participant; and to determine a position of the mobile participant by means of a processing unit depending on the first distance and depending on the second distance.

In one advantageous example, the device according to the second aspect is designed to carry out the method according to the first aspect.

A third aspect relates to a mobile or stationary participant of a wireless communication network which comprises the device according to the second aspect.

A fourth aspect relates to a network unit which is disposed remotely from a wireless communication network and comprises the device according to the second aspect.

A fifth aspect of this description relates to a wireless communication network comprising the device according to the second aspect, a plurality of stationary participants, a plurality of replicator units and at least one mobile participant.

DETAILED DESCRIPTION

Figure 1:
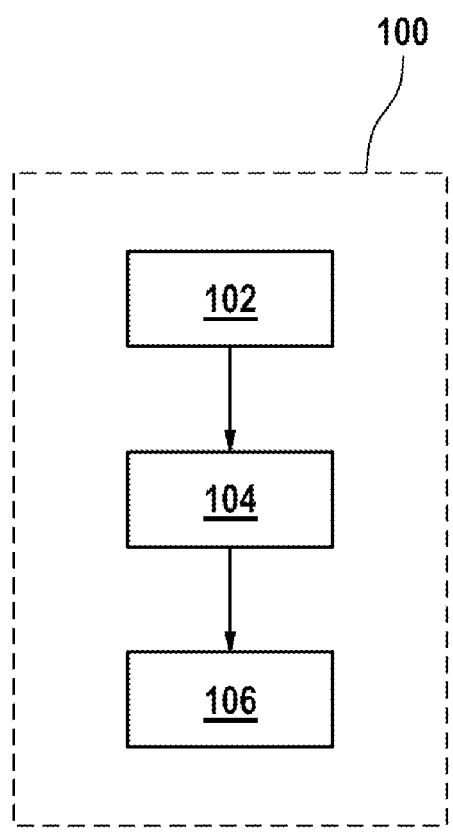
FIGS. 1 and 5 in each case show a schematic flow diagram.
Figure 2:
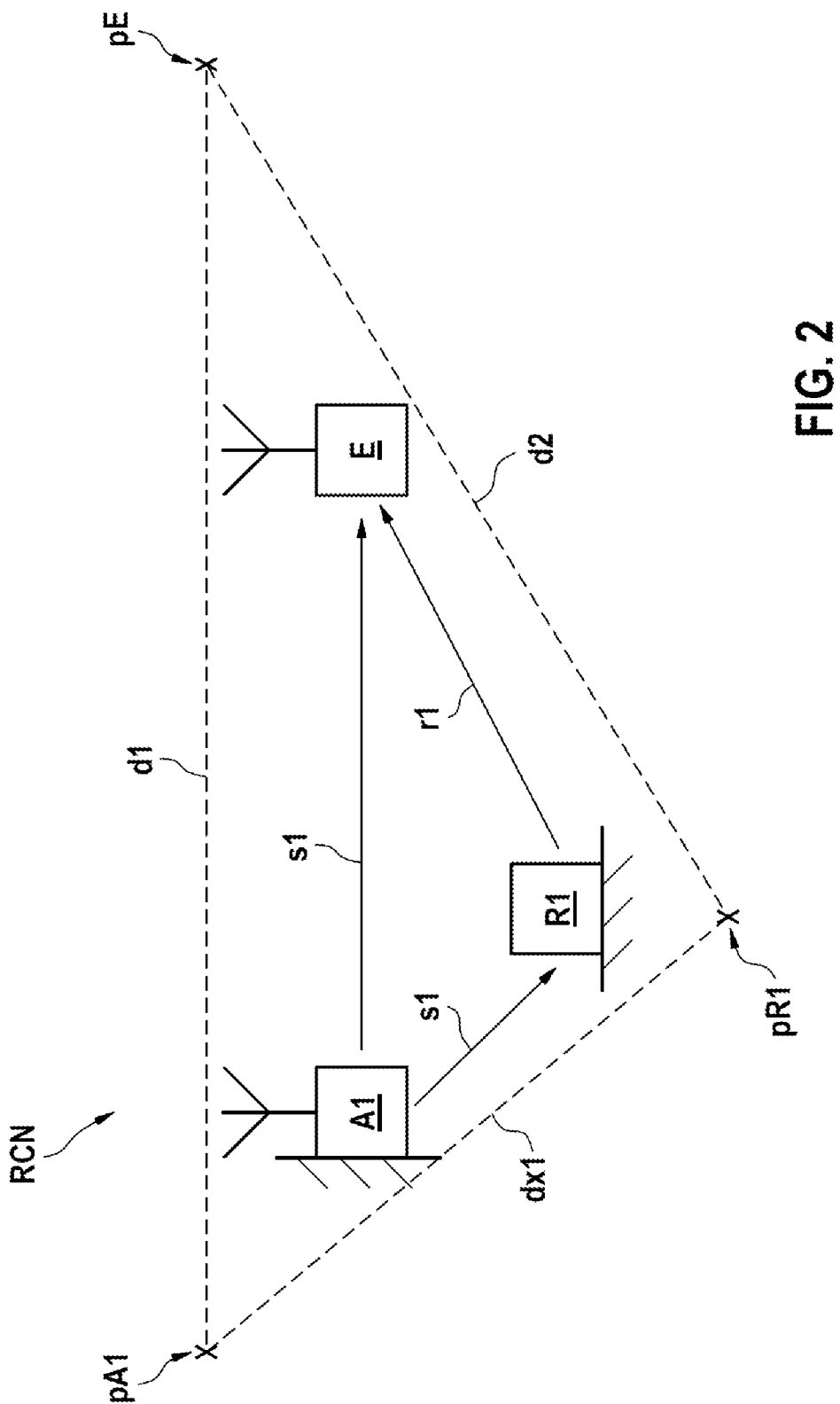
FIGS. 2, 3 and 4 in each case show a schematically presented wireless communication network.
Figure 3:
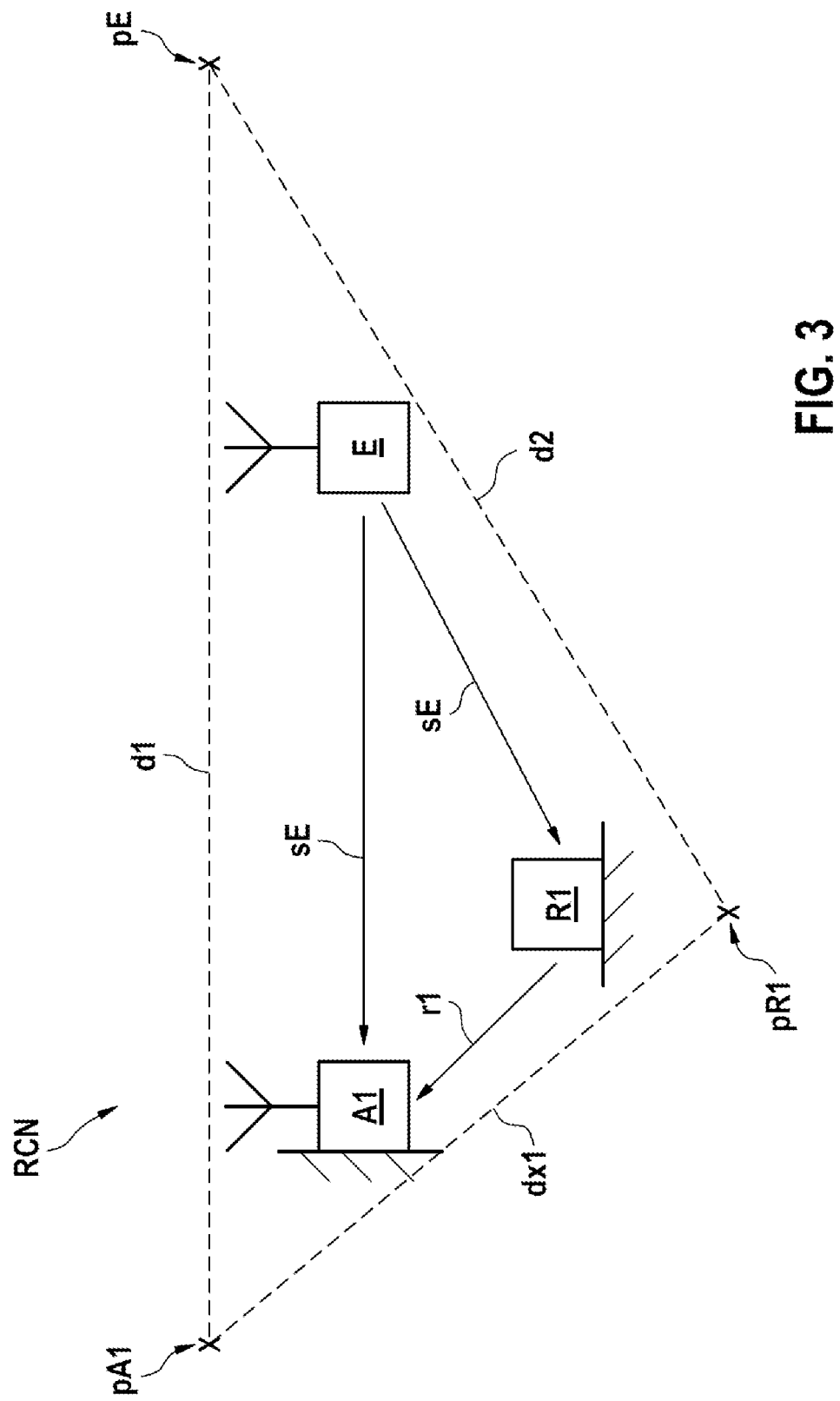

FIG. 1 shows a schematic flow diagram for determining a position of a mobile participant E of a wireless communication network RCN and FIGS. 2 and 3 show a respective configuration of a radiocommunication within a wireless communication network RCN. Reference is made simultaneously below to FIGS. 1 to 3. It should further be noted that the presentation of the wireless communication network RCN is only schematic. In particular, the positions and distances shown are presented separately from the respective associated units for greater clarity.

A first distance d1 between the mobile participant E and the stationary participant A1 of the wireless communication network RCN is determined by means of a processing unit 102 depending on a location signal s1 or sE transmitted by the stationary participant A1 or by the mobile participant E.

A second distance d2 between a stationary replicator unit R1 and the mobile participant E is determined by means of a processing unit 104 depending on a replicated signal r1 which is transmitted by means of the stationary replicator unit R1 depending on the location signal s1 or sE, and depending on a further distance dx1 between the replicator unit R1 and the stationary participant A1. The spatial positions pR1, pA1 of the replicator unit R1 and of the stationary participant A1 are known, whereby the further distance dx1 is also known.

A position pE of the mobile participant E is determined by means of a processing unit 106 depending on the first distance d1 and depending on the second distance d2. Additional distances are obviously used for the more precise determination of the spatial position pE.

For example, the signal transit time or the signal transit time difference of the reflected signal is determined in the stationary participant A1 in addition to the transit time or the transit time difference of the directly received location signal. These transit times are used as originating from "virtual" anchor nodes for the localization.

The device 100 can be disposed within one of the shown participants A1 or E of the wireless communication network RCN or in a network unit (not shown) disposed remotely from the wireless network RCN. In a further example, the wireless communication network RCN comprises the device 100, a plurality of stationary participants, a plurality of replicator units and at least one mobile participant E.

The mobile and stationary participants A1, E of the wireless communication network RCN are designed as fully functional network nodes, i.e. they are fully functional participants having a data transmitter unit and a data receiver unit and participate in the data radiocommunication of the wireless communication network RCN.

Conversely, the replicator R1 is not a direct participant of the wireless communication network RCN. The replicator unit R1 either requires no energy at all if it is designed as passive, or it requires only a very small amount of power, since, for example, it merely amplifies the received location signal. The replicator unit R1 thus has a longer battery life, little implementation outlay and lower production costs compared with the stationary participant A1 of the wireless communication network RCN.

If the replicator unit R1 is designed as passive, the replicator unit R1 reflects the incoming location signals.

If the replicator unit R1 is designed as active, it can amplify the received location signal s1 for the purpose of better separability and can transmit it as the replication r1. In this example, the replicator unit R1 is designed as an HF relay.

Different multilateration algorithms can be used for the proposed determination of the spatial position of the mobile participant. At least one coordinate, for example, can be determined in a plane from the at least two distances d1 and d3, wherein the coordinate according to the spatial position pE is an intersection of two circles around the respective center pA1, pR2 with the radius d1, d3. If at least three distances d1, d2 and d3 are present, an intersection in space according to the spatial position pE can be determined, for example, via an intersection of spheres which in each case have a center according to pA1, pR2, pR1 and a radius according to d1, d2, d3.

The location signals or the one location signal s1 used in this description can be transmitted during a further radio data transmission. In a further example, the at least one location signal s1 serves the exclusive purpose of transit time measurement or location of the mobile participant E.

The at least one location signal s1 comprises, for example, a previously known training sequence such as a Gold sequence or a Zadoff-Chu sequence with which a channel pulse response or a parameter related thereto is determined. This is used in the data transmission e.g. for the purpose of equalization. From the training sequence, the absolute signal transit time can be determined in the case of transmitters and receivers that are time-synchronized with one another, or the relative signal transit time or transit time difference from the transmitter to the receiver can be determined in the case of unsynchronized participants. With the transit times or transit time differences to a plurality of stationary participants of which, for example, at least a number of four are present for a position determination in space on the basis of time differences, the position of the mobile participant is calculated using a multilateration algorithm, wherein the position of the associated stationary participants is known. The method provided in this description or a corresponding device are usable for a multiplicity of measured value types (e.g. time of arrival or time difference of arrival) and independently from the chosen solution algorithm for the multilateration problem.

According to the example shown in FIG. 2, the participant A1 transmits the location signal s1 which comprises a training sequence. The signal transit time or the signal transit time difference from the participant A1 to the participant E is determined by means of the location signal s1. Due to the omnidirectional characteristic of the antennas of the participant A1, the location signal s1 also reaches the replicator unit R1 which reflects or replicates the location signal s1 so that the replications r1 overlap one another or arrive at different times in the receiver of the mobile participant E. In addition to the relative transit time of the direct line-of-sight signal in the form of the directly received location signal s1, the transit time of the reflected location signals in the sense of the replication signal r1 relative to the line-of-sight signal is determined from the channel pulse response with an algorithm such as, for example, peak search.

A first signal transit time between the stationary participant A1 and the replicator unit R1 can be determined from the further distance dx1 by means of the speed of light. A second signal transit time between the replicator unit R1 and the mobile participant E is derived from the difference between the measured signal transit time of the signal r1, wherein this signal transit time between the stationary participant A1 and the mobile participant E is determined, and the first signal transit time.

The transit times are determined for a plurality of replicator units R1 which have line-of-sight contact with the mobile participant E and the procedure is repeated for a plurality of stationary participants A1 and therefore also for the replicator units R1, etc. The spatial position of the mobile participant E is then determined from the transit times or transit time differences measured in this way by means of the known position of the stationary participants A1, etc., and the replicator units R1, etc., using the chosen multilateration algorithm. The resulting transit times or transit time differences are converted into distances by means of the speed of light.

As already explained, the multilateration algorithm can also be executed by the network unit which is remote from the wireless communication network RCN. For this purpose, the participants involved in the wireless communication network RCN transmit the determined signal transit times or signal transit time differences to the remotely disposed network unit, which can be performed, for example, via the existing wireless communication network RCN. The localization result in the form of the spatial position of the mobile participant E can be used on the remotely disposed network unit, can be communicated to a different participant and/or can be transmitted to the located mobile participant via data radio.

The localization of the terminal device can also be performed by the network of the stationary participants A1, etc., if the mobile participant transmits the location signal sE and the stationary participants A1, etc., perform the analysis of the channel pulse response. The position calculation can then be performed in a distributed manner among all or a selection of stationary participants A1 and/or in remotely disposed network unit.

If the positions of the replicator units R1, etc., are not previously known, the positions of the replicator units R1, etc., can be learnt successively by carrying out the method repeatedly, wherein a respective stationary participant of the stationary participants A1 or the mobile participant E, etc., acts as the transmitter and simultaneously as the receiver with known position. Due to the reflections of the transmitted location signal by the respective replicator unit, the transit time from the respective stationary participant A1 to the replicator unit R1 corresponds to half of the measured transit time due to the outward and return path. The same principle can be applied here as is used for the localization of the mobile participant.

Figure 4:
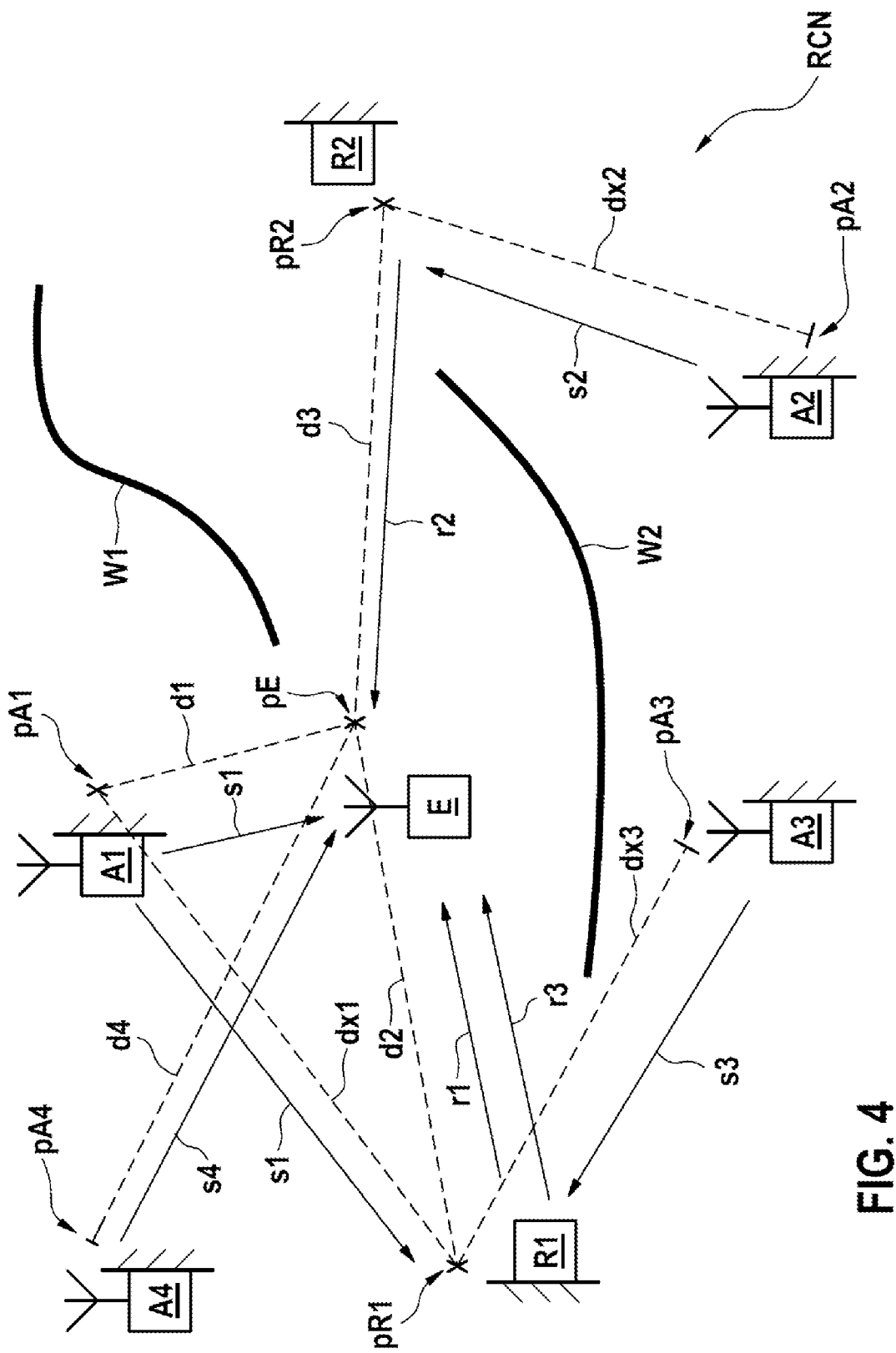

If it is assumed, for example, that the spatial position pR1 of the replicator unit R1 is not yet known, the example shown in FIG. 4 comprises: determining a third distance dx1 between a or the first participant A1 of the wireless communication network RCN and the stationary replicator unit R1 depending on a location signal s1 transmitted by the first stationary participant A1; determining a fourth distance dx2 between a second participant A3 and the stationary replicator unit R1 depending on a location signal s3 transmitted by the second stationary participant A3; and determining a position pR1 of the replicator unit R1 depending on the first distance d1 and depending on the second distance d2. Alternatively to the use of the stationary participant A1, the mobile participant E and its known position pE can also serve to determine the position pR1. Additionally known distances to the replicator unit R1 obviously enable an improved estimation or determination of the spatial position pR1.

The positions of the replicator units determined in this way are stored centrally and are provided to all participants. An extensive localization network which calibrates itself step-by-step can thus be successively set up.

Figure 5:
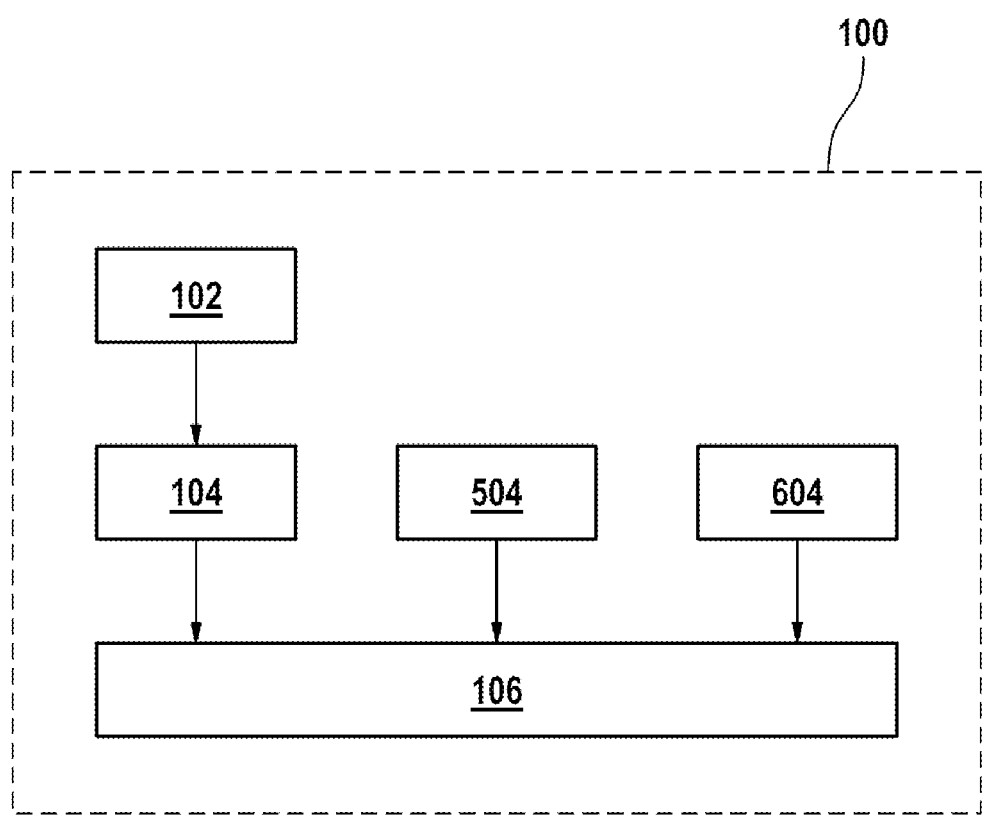

FIG. 4 shows the wireless communication network RCN and FIG. 5 shows a schematic flow diagram. Reference is made below to both FIGS. 4 and 5.

The wireless communication network RCN shown in FIG. 4 is located in an environment with two obstacles W1 and W2 which are designed, for example, as walls. Due to the obstacles W1 and W2, no direct line-of-sight connection exists between a plurality of participants A1-A4 and replicator units R1, R2. The stationary participants A2 and A3, for example, are hidden from the mobile participant E behind the obstacle W2, so that no line-of-sight connection to the mobile participant E exists between the respective stationary participants A2 and A3. However, the participant A2, A3 has a direct line-of-sight connection to the replicator unit R1, R2. The replicator unit R1, R2 in turn has a direct line-of-sight connection to the mobile participant E.

The direct line-of-sight connection between the replicator unit R2 and the mobile participant E can be used by means of the stationary participant A2 whereby the participant A2 transmits a location signal s2 or receives a replicated signal (not shown) based on the location signal which emanates from the participant E. The method therefore comprises determining, by means of a processing unit 504, the at least one further distance d3 between the further stationary replicator unit R2 and the mobile participant E depending on a further replicated signal r2 which is transmitted by means of the further stationary replicator unit R2 depending on the location signal s2 transmitted by a further stationary participant A2 or the mobile participant E, and depending on a further distance dx2 between the further stationary replicator unit R2 and the stationary participant A2.

The stationary participant A4 has direct line-of-sight contact to the mobile participant E. The method therefore comprises determining, by means of a processing unit 504, the at least one further distance d4 between the further stationary participant A4 and the mobile participant E depending on a further location signal s4 which is transmitted by means of the further stationary participant A4.

The replicator unit R1 can be used multiple times for a location procedure for the mobile participant E. In particular, a plurality of stationary participants A1 and A3 use the one replicator unit R1 to determine the spatial position of the mobile participant E. The method therefore comprises determining, by means of a processing unit 604, the second distance d2, in particular a further value of the second distance d2, between the stationary replicator unit R1 and the mobile participant E depending on a further replicated signal r3 which is transmitted by means of the stationary replicator unit R1 depending on the location signal E of the mobile participant E or a location signal s3 transmitted by a further stationary participant A3, and depending on a further distance dx3 between the replicator unit R1 and the further stationary participant A3.

The invention claimed is:

1. A method for determining a position (pE) of a mobile participant (E) of a wireless communication network (RCN), wherein the method comprises:
    determining (102) a first distance (d1) between the mobile participant (E) and a stationary participant (A1) of the wireless communication network (RCN) depending on a location signal (s1; sE) transmitted by the stationary participant (A1) or by the mobile participant (E);
    determining (104) a second distance (d2) between a stationary replicator unit (R1) and the mobile participant (E) depending on a replicated signal (r1), which is transmitted by means of the stationary replicator unit (R1) depending on the location signal (s1; sE), and depending on a further distance (dx1) between the replicator unit (R1) and the stationary participant (A1); and
    determining (106) a position (pE) of the mobile participant (E) depending on the first distance (d1) and depending on the second distance (d2).

2. The method according to claim 1, wherein the method comprises:
    determining (504) at least one further distance (d3; d4) between the mobile participant (E) and a further stationary replicator unit (R2) or a further stationary participant (A4); and
    determining (106) the position (pE) of the mobile participant (E) depending on the first distance (d1), depending on the second distance (d2) and depending on the at least one further distance (d3; d4).

3. The method according to claim 2, wherein the method comprises:
    determining (504) the at least one further distance (d3) between the further stationary replicator unit (R2) and the mobile participant (E) depending on a further replicated signal (r2) which is transmitted by means of the further stationary replicator unit (R2) depending on a location signal (s2) transmitted by a further stationary participant (A2) or by the mobile participant (E), and depending on a further distance (dx2) between the further stationary replicator unit (R2) and the stationary participant (A2).

4. The method according to claim 2, wherein the method comprises:
    determining (504) the at least one further distance (d4) between the further stationary participant (A4) and the mobile participant (E) depending on a further location signal (s4) which is transmitted by means of the further stationary participant (A4).

5. The method according to claim 1, wherein the method comprises:
    determining (604) a further value of the second distance (d2) between the stationary replicator unit (R1) and the mobile participant (E) depending on a further replicated signal (r3) which is transmitted by means of the stationary replicator unit (R1) depending on the location signal (r3) of the mobile participant (E) or a location signal (s3) transmitted by a further stationary participant (A3), and depending on a further distance (dx3) between the replicator unit (R1) and the further stationary participant (A3).

6. The method according to claim 1, wherein the method comprises:
    determining a third distance between another participant or the first participant (A1) of the wireless communication network (RCN) and the stationary replicator unit (R1) depending on a location signal (s1) transmitted by the first stationary participant (A1);
    determining a fourth distance between a second participant (A3) and the stationary replicator unit (R1) depending on a location signal (s3) transmitted by the second stationary participant (A3); and
    determining a position (pR1) of the replicator unit (R1) depending on the first distance (d1) and depending on the second distance (d2).

7. A device (100) for determining a position of a mobile participant (E) of a wireless communication network (RCN), wherein the device (100) is configured to:
    determine a first distance (d1) between the mobile participant (E) and a stationary participant (A1) of the wireless communication network (RCN) by means of a processing unit (102) depending on a location signal (s1; sE) transmitted by the stationary participant (A1) or the mobile participant (E);
    determine a second distance (d2) between a stationary replicator unit (R1) and the mobile participant (E) by means of a processing unit (104) depending on a replicated signal (r1), which is transmitted by means of the stationary replicator unit (R1) depending on the location signal (s1; sE), and depending on a further distance (dx1) between the replicator unit (R1) and the stationary participant (A1); and
    determine a position (pE) of the mobile participant (E) by means of a processing unit (106) depending on the first distance (d1) and depending on the second distance (d2).

8. A mobile or stationary participant (E; A1) of a wireless communication network (RCN) which comprises the device (100) according to claim 7.

9. A network unit which is disposed remotely from a wireless communication network (RCN) and which comprises the device (100) according to claim 7.

10. A wireless communication network (RCN) comprising the device (100) according to claim 7, a plurality of stationary participants (A1-A4), a plurality of replicator units (R1, R2) and at least one mobile participant (E).

11. The device according to claim 7, further configured to:
determine (504) at least one further distance (d3; d4) between the mobile participant (E) and a further stationary replicator unit (R2) or a further stationary participant (A4); and
determine (106) the position (pE) of the mobile participant (E) depending on the first distance (d1), depending on the second distance (d2) and depending on the at least one further distance (d3; d4).

12. The device according to claim 7, further configured to:
determine (504) the at least one further distance (d3) between the further stationary replicator unit (R2) and the mobile participant (E) depending on a further replicated signal (r2) which is transmitted by means of the further stationary replicator unit (R2) depending on a location signal (s2) transmitted by a further stationary participant (A2) or by the mobile participant (E), and depending on a further distance (dx2) between the further stationary replicator unit (R2) and the stationary participant (A2).

13. The method according to claim 7, further configured to:
determine (504) the at least one further distance (d4) between the further stationary participant (A4) and the mobile participant (E) depending on a further location signal (s4) which is transmitted by means of the further stationary participant (A4).

* * * * *